United States Patent
Haberkorn

(10) Patent No.: US 11,372,838 B2
(45) Date of Patent: *Jun. 28, 2022

(54) PARALLEL PROCESSING OF CHANGES IN A DISTRIBUTED SYSTEM

(71) Applicant: SAP SE, Walldorf (DE)

(72) Inventor: Michael Haberkorn, Bad Schoenborn (DE)

(73) Assignee: SAP SE, Walldorf (DE)

( * ) Notice: Subject to any disclaimer, the term of this patent is extended or adjusted under 35 U.S.C. 154(b) by 75 days.

This patent is subject to a terminal disclaimer.

(21) Appl. No.: 16/935,663

(22) Filed: Jul. 22, 2020

(65) Prior Publication Data

US 2022/0027337 A1  Jan. 27, 2022

(51) Int. Cl.
*G06F 16/23* (2019.01)
*G06F 16/22* (2019.01)
*G06F 16/18* (2019.01)
*G06F 16/17* (2019.01)

(52) U.S. Cl.
CPC ...... *G06F 16/2358* (2019.01); *G06F 16/1734* (2019.01); *G06F 16/1858* (2019.01); *G06F 16/2282* (2019.01)

(58) Field of Classification Search
CPC ............. G06F 16/2358; G06F 16/2282; G06F 16/1858; G06F 16/1734
See application file for complete search history.

(56) References Cited

U.S. PATENT DOCUMENTS

| | | | | |
|---|---|---|---|---|
| 2008/0114817 | A1* | 5/2008 | Gheorghioiu | G06F 16/2358 |
| 2015/0378774 | A1* | 12/2015 | Vermeulen | G06F 9/466 |
| | | | | 707/703 |
| 2016/0110408 | A1* | 4/2016 | Madhavarapu | G06F 16/2358 |
| | | | | 707/615 |
| 2018/0046664 | A1* | 2/2018 | Nishikawa | G06F 9/5055 |
| 2019/0303470 | A1* | 10/2019 | Lee | G06F 16/2282 |
| 2020/0401562 | A1* | 12/2020 | Demoor | G06F 16/1865 |

OTHER PUBLICATIONS

Das, Shirshanka et al., "All Aboard the Databus!", Proceedings of the Third ACM Symposium on Cloud Computing, Socc '12, Oct. 14-17, 2021, San Jose, CA USA, XP055709751, DOI: 10.1145/2391229.2391247, ISBN: 978-1-4503-1761-0, 14pgs.

(Continued)

*Primary Examiner* — Matthew J Ellis
(74) *Attorney, Agent, or Firm* — Buckley, Maschoff & Talwalkar LLC

(57) ABSTRACT

Systems and methods include reception of a request for changed data of an object from a subscriber, determination of a logging table associated with the object and comprising a plurality of logging table entries, determination of a pointer to a last-processed entry of the logging table based on the object and the subscriber, definition of a plurality of sub-portions of logging table entries subsequent to the last-processed entry, and reconstruction and transfer of first data associated with a first one of the plurality of sub-portions to the subscriber using a first process, and reconstruction and transfer, in parallel with the first process, second data associated with a second one of the plurality of sub-portions to the subscriber using a second process.

19 Claims, 10 Drawing Sheets

(56) References Cited

OTHER PUBLICATIONS

Kreps, Jay et al., "Kafka: a Distributed Messaging System for Log Processing", NetDB 2011, Athens, Greece, Jun. 12, 2011 (Jun. 12, 2011), XP055186290, ACM, Retrieved from the Internet: URL:http://research.microsoft.com/en-us/um/people/srikanth/netdb11papers/netdb11-final12.pdf, [retrieved on Apr. 28, 2015], 7pgs.
Anonymous: "Data parallelism—Wikipedia", May 30, 2020 (May 30, 2020), XP055870059, Retrieved from the Internet: URL:https://en.wikipedia.org/w/index.php?title=data_parallelism&oldid=959840266, [retrieved on Dec. 7, 2021], 6pgs.
Lee, Juchang et al., "Parallel replication across formats for scaling out mixed OLTP/OLAP workloads in main-memory databases". The VLDB Journal, vol. 27, No. 3, Apr. 16, 2018 (Apr. 16, 2018), XP036516135, ISSN: 1066-8888, DOI: 10.1007/s00778-018-0503-z, [retrieved on Apr. 16, 2018], (pp. 421-444, 24 total pages).
"Communication: The Extended European Search Report", European Patent Office, dated Dec. 17, 2021 (Dec. 17, 2021), tor European Application No. 21184592.0-1222, 10pgs.

\* cited by examiner

422

| Client | Subscriber ID | Object Name | Object Type | Max # Records per Sub-Portion | Parallelization Mode |
|---|---|---|---|---|---|
|  |  |  |  |  |  |
|  |  |  |  |  |  |
|  |  |  |  |  |  |

| Client | Timestamp | Subscriber ID | Object Name | Object Type | Status | In Calculation | Parallelization Mode |
|---|---|---|---|---|---|---|---|
|  |  |  |  |  |  |  |  |
|  |  |  |  |  |  |  |  |
|  |  |  |  |  |  |  |  |

| Order ID | Item ID | Sequence ID | Timestamp | Operation | User |
|---|---|---|---|---|---|
|  |  |  |  |  |  |
|  |  |  |  |  |  |
|  |  |  |  |  |  |

| Client | Subscriber ID | Object Name | Object Type | Subscriber Logging Table | Last Processed Pointer |
|---|---|---|---|---|---|
|  |  |  |  |  |  |
|  |  |  |  |  |  |
|  |  |  |  |  |  |

| Client | Delta Timestamp | Subscriber ID | Object Name | Object Type | Sub-Portion ID | Status | Status Timestamp |
|---|---|---|---|---|---|---|---|
|  |  |  |  |  |  |  |  |
|  |  |  |  |  |  |  |  |
|  |  |  |  |  |  |  |  |

| Client | Portion ID | Subscriber Logging Table | Low Value | High Value |
|---|---|---|---|---|
|  |  |  |  |  |
|  |  |  |  |  |
|  |  |  |  |  |

FIG. 10

PARALLEL PROCESSING OF CHANGES IN A DISTRIBUTED SYSTEM

BACKGROUND

Conventional database systems store large volumes of data related to many aspects of an enterprise. It is often desirable to mirror respective portions of the data stored in one system (i.e., a source system) within one or more other systems (i.e., target systems). For example, it may be desirable to mirror a portion of data stored in a source system which is particularly suited for data acquisition and storage within a target system which is particularly suited for data analysis.

A replication server may be used to create and update target objects (e.g., tables or views) in a target system which mirror respective source objects in a source system. The replication server may utilize a change data capture mechanism executing on the source system. The change data capture mechanism includes database triggers executing on the source system which identify and log changes which occur to specified source objects. In operation, the replication server requests changed data from the change data capture mechanism, and the change data capture compiles the logged changes and returns the compiled changes to the replication server. The replication server then applies the compiled changes to corresponding target objects.

Conventionally, the change data capture mechanism compiles the changes using a single process. Such sequential processing may be sufficient if latency requirements are lenient or the number of changes for a given object is low. However, sequential processing may be insufficient for objects exhibiting a high change rate and/or use cases which require a short latency between source object changes and transfer of the changes to a respective target object.

Systems for improving the performance of change compilation and transfer of changes to a target system are desired.

BRIEF DESCRIPTION OF THE DRAWINGS

FIG. 5 is a tabular representation of performance settings according to some embodiments.

FIG. 6 is a tabular representation of a subscriber worklist according to some embodiments.

FIG. 7 is a tabular representation of a subscriber logging table according to some embodiments.

FIG. 8 is a tabular representation of a last-processed pointer table according to some embodiments.

FIG. 9 is a tabular representation of a sub-portion information table according to some embodiments.

FIG. 10 is a tabular representation of a sub-portion boundaries table according to some embodiments.

DETAILED DESCRIPTION

The following description is provided to enable any person in the art to make and use the described embodiments. Various modifications, however, will remain readily-apparent to those in the art.

Some embodiments provide parallel processing of logged changes to objects of a source system. Such parallel processing includes parallel compilation of the logged changes and transfer of the compiled changes to a requesting subscriber. Generally, parallel processing is provided by dividing logged changes for a given subscriber/object combination into sub-portions and processing each sub-portion in parallel. Mechanisms for tracking parallel processing of the sub-portions to avoid collision, commit successful processing, and handle processing failures are also provided.

Figure 1:
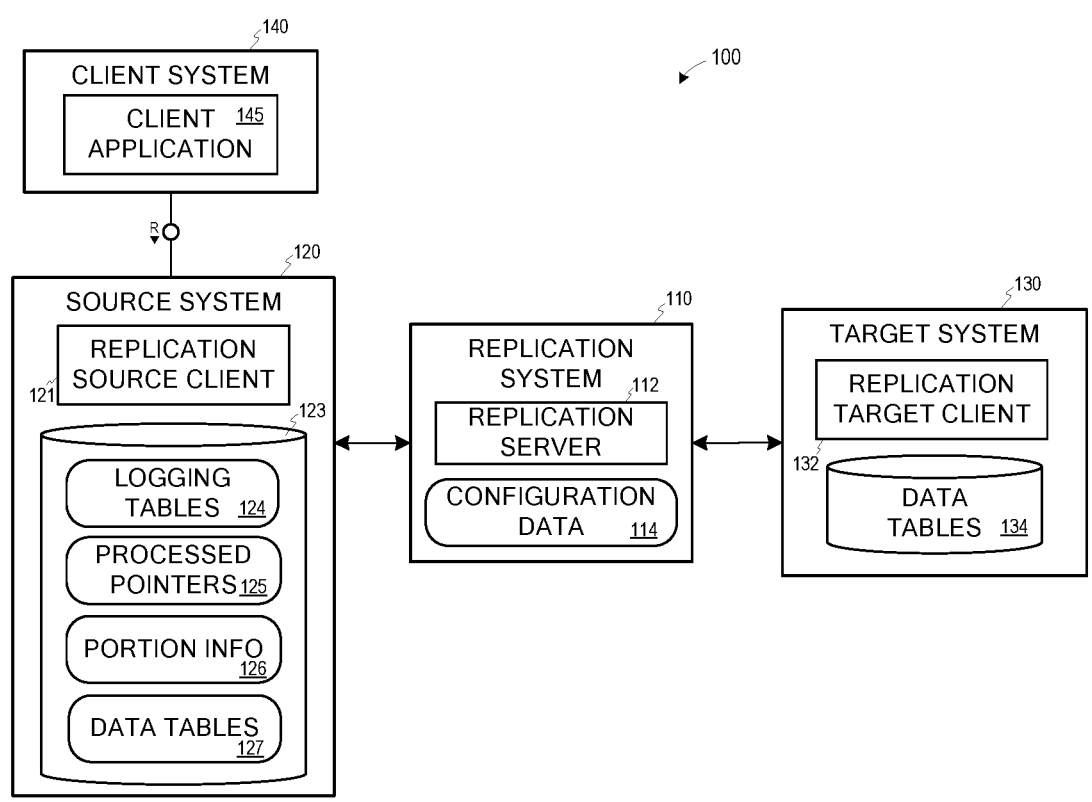
FIG. 1 is a replication architecture according to some embodiments.

FIG. 1 illustrates system 100 according to some embodiments. System 100 includes replication system 110 for replicating data from source system 120 into target system 130. Although FIG. 1 illustrates one source system and one target system, in some embodiments replication system 110 may replicate data from any number of source systems to any number of target systems.

Generally, replication system 110 may execute replication server 112 based on configuration data 114 to maintain a replica of one or more objects (e.g., tables, views) of source system 120 in target system 130. Configuration data 114 may specify particular objects of a particular source system to be replicated in one or more particular target systems for a particular subscriber. Maintaining such replicas includes replicating records of specified ones of data tables 127 to data tables 134.

Client device system 140 may execute client application 145 to communicate with source system 120. Client application 145 may comprise code executing within a Web browser executed by client system 140 according to some embodiments. Client application 145 may comprise a business application which accesses data of data tables 127. Such access may include inserting new records, updating existing records or deleting existing records of data tables 127. Client application 145 may also or alternatively provide data archiving functionality to move selected records of data tables 127 to an archive data storage (not shown).

Source system 120 may execute replication source client 121 to record changes to objects specified in configuration data 114 in logging tables 124. According to some embodiments, replication source client 121 includes database triggers to detect insert, update and delete operations which are performed on records of specified ones of data tables 127 during database transactions. In some embodiments, an individual database trigger is created for each operation on each specified table. The database triggers record the detected operations as log entries in corresponding ones of logging tables 124. In a case that the object is a data table, the object is associated with only one logging table 124. If the object is a view which selects data from more than one underlying data table, the object is associated with one logging table per 124 underlying data table.

As will be described in detail below, logging tables 124 may include, for each database record affected by a database transaction, a log entry specifying the key field values of the database record and the type of operation performed on the record. Replication source client 121 may further include an observer process which reads the log entries and writes similar log entries into subscriber logging tables, each of which is associated with particular data table. Based on a request received from a subscriber (e.g., replication server 112) for changed data of a given object, a data reconstruction and transfer process of replication source client 121 reconstructs the changed data based on the log entries and transfers the changed data to the subscriber for subsequent transfer to a target system. As mentioned above, two or more data reconstruction and transfer processes may proceed in parallel to reconstruct and transfer the changed data.

In particular, processed pointers 125 indicate, for a given subscriber and object, one or more subscriber logging tables and, for each of the one or more subscriber logging tables, a last subscriber logging table entry processed by the given subscriber. Also known are a current maximum pointer (i.e., a pointer to a current last entry) for each of the one or more subscriber logging tables. A "main" portion of logging table entries is determined for each of the one or more subscriber logging tables based on processed pointers 125 and the current maximum pointers. The main portion consists of all entries subsequent to the last-processed subscriber logging table entry up to and including the current last entry.

To enable parallel processing of the main portions of logging table entries, each main portion is divided into two or more sub-portions of logging table entries. The size of each sub-portion may be determined based on a setting corresponding to the subscriber/object combination. Dividing a main portion into two or more sub-portions according to some embodiments is described in detail below.

Portion information 126 stores a status and boundaries (e.g., pointers to the first and last entries) of each sub-portion. In operation, data reconstruction and transfer processes use portion information 126 to reconstruct and transfer data associated with each sub-portion in parallel as will be described below.

The data stored within tables 127 and tables 134 may comprise one or more of conventional tabular data, row-based data, column-based data, and object-based data. According to some embodiments, replication server 112 operates to perform any transformations necessary to convert data from a format of tables 127 to a format of tables 134. The data may be distributed among several relational databases, dimensional databases, and/or other data sources.

Each of source system 120 and target system 130 may comprise any computing system capable of executing a database management system, of storing and independently managing data of one or more tenants and, in some embodiments, of supporting the execution of database server applications. Each of source system 120 and target system 130 may include a distributed storage system and/or distributed server nodes for performing computing operations as is known in the art. According to some embodiments, source system 120 is an on-premise transactional database system and target system 130 is an in-memory database system configured to provide data analytics, but embodiments are not limited thereto. In this regard, a client application (not shown) may communicate with one or more server applications (not shown) executing on target system 130 to perform data analytics on data stored in tables 134.

Source system 120 and target system 130 may implement an in-memory database, in which a full database is stored in volatile (e.g., non-disk-based) memory (e.g., Random Access Memory). The full database may be persisted in and/or backed up to fixed disks (not shown). Embodiments are not limited to in-memory implementations. For example, source system 120 and target system 130 may store data in Random Access Memory (e.g., cache memory for storing recently-used data) and one or more fixed disks (e.g., persistent memory for storing their respective portions of the full database).

Figure 2:
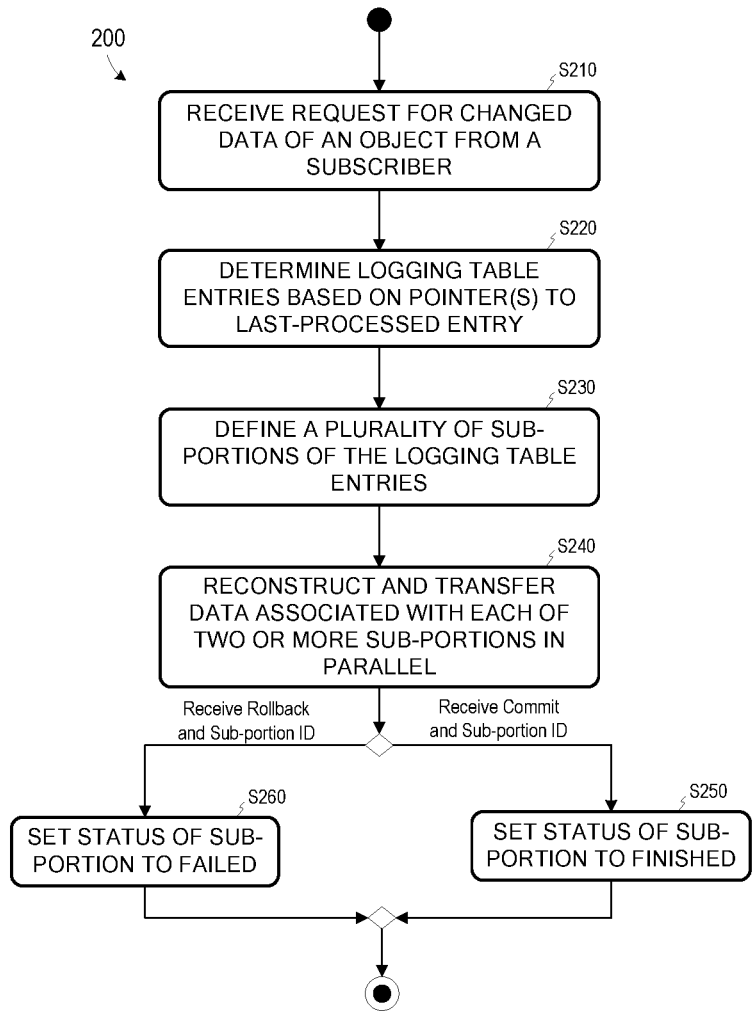
FIG. 2 is a flow diagram of parallel processing of changes according to some embodiments.

FIG. 2 illustrates process 200 to replicate data changes in parallel according to some embodiments. Process 200 may be performed by replication source client 121 of FIG. 1 but embodiments are not limited thereto.

Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

According to some embodiments, a request is received from a subscriber for changed data of an object at S210. It will be assumed that changed data of the object exists and that flow therefore proceeds to S220. The determination of whether changed data exists according to some embodiments will be described below.

At S220, logging table entries associated with the subscriber and the object are determined based on one or more pointers to last-processed logging table entries. In one example of S220, subscriber logging tables associated with the object are determined. The object is associated with only one subscriber logging table if the object is a data table, and with more than one subscriber logging table if the object is a view which selects data from more than one underlying data table.

According to some embodiments of S220, a last-processed pointer is determined for each of the determined subscriber logging tables based on the subscriber, the object, and a data structure (e.g., processed pointers 125) indicating, for various combinations of subscribers, objects, and logging tables, pointers to last-processed logging table entries. Also determined is a current maximum pointer (i.e., a pointer to a current last entry) for each of the one or more subscriber logging tables. The logging table entries are then determined for each of the one or more subscriber logging tables at S220 based on the last-processed pointers and the current maximum pointers. The determined entries consist of all entries subsequent to the last-processed subscriber logging table entry up to and including the current last entry.

Next, at S230, a plurality of sub-portions of the determined logging table entries are defined. The size of each sub-portion may be determined based on a maximum number of entries per sub-portion specified for the subscriber/object combination. A definition of a sub-portion may specify a corresponding subscriber logging table, a status, and pointers to the first and last entries of the sub-portion.

Figure 3:
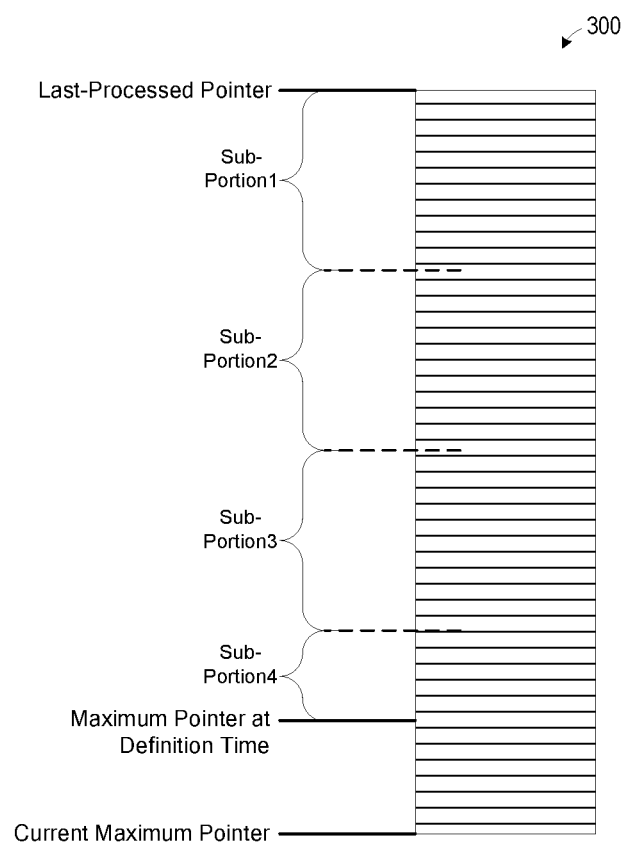
FIG. 3 illustrates sub-portions of subscriber logging table entries according to some embodiments.

FIG. 3 illustrates determination of logging table entries and definition of sub-portions at S220 and S230 according to some embodiments. As shown, a range of logging table entries 300 is determined based on the last-processed pointer and a current (i.e., at S220) maximum pointer. The range is divided into sub-portions 1-4 according to the pre-specified maximum number of records per portion for the given object and subscriber. Unless the records of the range are equally divisible by the specified maximum number of records, the last sub-portion (i.e., sub-portion4) will include fewer entries than the specified maximum number of records per portion. S230 comprises storage, in association with an identifier of each sub-portions 1-4, pointers to a first and to a last entry of the associated sub-portion.

The source system will continue to execute database transactions during S220 and S230, which may result in the addition of logging table entries and a corresponding increase in the maximum pointer as shown in FIG. 3. These added logging table entries (i.e., located between the old maximum pointer and the current maximum pointer) are ignored during S230 and will be handled in a next processing run.

At S240, the determined logging table entries for each sub-portion are used to compile data records corresponding to the changed data of each sub-portion as is known in the art and the data records are transferred, along with the sub-portion ID, to the subscriber. The compilation and transfer of data records associated with one sub-portion may occur in parallel with the compilation and transfer of data records associated with at least one other sub-portion.

If the subscriber successfully transfers the data records associated with a sub-portion to a target system, a call to a commit API including the sub-portion ID may then be received from the subscriber. In response, the status of the sub-portion is set to finished at S250. If transfer of the data to target system is not successful, the subscriber may call a rollback API with the sub-portion ID. The rollback API sets the status of the sub-portion to failed at S260.

As will be described below, various clean-up mechanisms may attend to updating the last-processed pointers of the logging tables and deleting logging table entries of the sub-portions once sub-portions are set to finished status. Other error handling mechanisms (e.g., for handling failed sub-portions or errors during sub-portion definition) are also described below.

Figure 4:
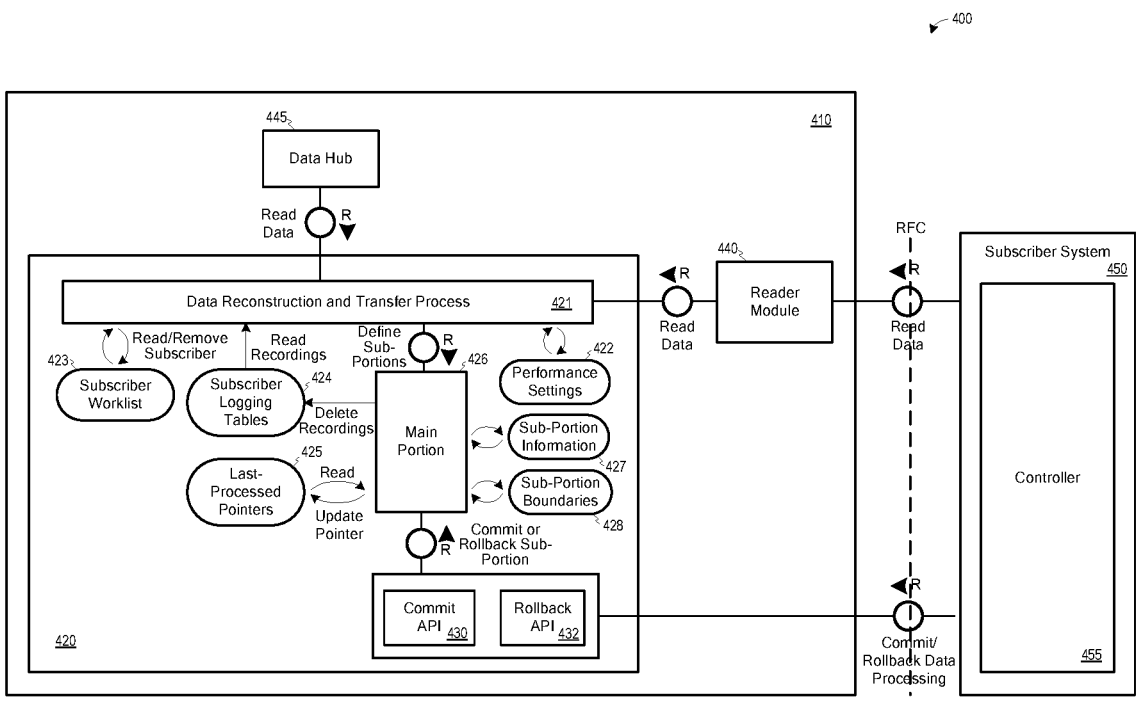
FIG. 4 is a block diagram of a subscriber system and a source system including a change data capture engine implementing parallel processing of changes according to some embodiments.

FIG. 4 illustrates system 400 according to some embodiments. System 400 may comprise an implementation of system 100 but embodiments are not limited thereto. Accordingly, embodiments of system 400 may execute process 200.

System 400 includes source system 410 and subscriber system 450. Source system 410 includes change data capture engine 420, which in turn includes data reconstruction and transfer process 421. Data reconstruction and transfer process 421 orchestrates the selection of logged changes and initiates the reconstruction of data depending on the respective object type. For a database table, data reconstruction and transfer process 421 returns complete records based on logged key field values. For a view, data reconstruction and transfer process 421 returns the result of the view itself based on the logged key field values, considering the individual join conditions and calculations of the view. After reconstruction, data reconstruction and transfer process 421 transfers the reconstructed result to the object subscriber which requested the transfer.

As described above, data reconstruction and transfer process 421 may operate on several sub-portions of logged key field values in parallel. Performance settings 422 define whether or not logging table entries of a particular object-subscriber combination are processed in parallel. Generally, parallelization settings may be determined with a goal of keeping a small number of records in the respective subscriber logging table, which is indicative of an up-to-date target system. For example, small objects and/or objects having low data velocity may be associated with sequential processing, while objects which experience many changes in a short time period may be associated with parallel processing.

Performance settings 422 also specifies a maximum number of records per sub-portion. In the case of sequential processing, the specified maximum number of records may define a maximum number of logging table entries to be processed at a given time by a sequential process. The maximum number of records associated with a particular object may be set in view of a preferred maximum amount of data to transfer over the network at a given time. The maximum number may therefore be determined based at least in part on a size of each record of the object. Therefore, the maximum number may associated with a table having many fields may be lower than the maximum number associated with a table having fewer fields.

FIG. 5 illustrates performance settings 422 for according to some embodiments. Each record of performance setting 422 specifies, for a particular combination of client (to account for a multi-tenant source system), subscriber ID, object name and object type, a maximum number of records per sub-portion and a parallelization mode. The parallelization mode may indicate sequential processing or any of one or more types of parallelization provided by process 421.

Subscriber worklist 423 may indicate, for a given subscriber and object, that the object has been updated since the object data was last received by the subscriber. A record of subscriber worklist 423 is updated when a change to object data occurs, when the change is being processed (i.e., reconstructed and transferred), and after that change is provided to a subscriber. FIG. 6 illustrates subscriber worklist 423 according to some embodiments. The key field values of subscriber worklist 423 specify a client, a timestamp, a subscriber ID, and object name and an object type. In response to a query from a subscriber, data reconstruction and transfer process 421 may determine (via the status field of subscriber worklist 423) whether updates to a particular object are available for the subscriber by querying subscriber worklist 423 with values of the corresponding key fields. The timestamp of a record may indicate a time at which the record was last changed, and may be used for error handling as described below.

In order to log changes to database tables (including database tables underlying views), change data capture engine 420 may create a plurality of database triggers (not shown) for each subscribed-to database table of source system 410 to capture any update or delete operations on records of the database tables. In some embodiments, a database trigger creates a log entry associated with each detected operation and saves the log entry in a master logging table (not shown) associated with the corresponding database table. An observer process (not shown) monitors the entries of the master logging tables and copies entries corresponding to committed operations, in sequential order and with monotonically increasing sequence numbers, into log entries of respective table-specific subscriber logging tables 424. Data reconstruction and transfer process 421 may reconstruct object data changes based on the entries of subscriber logging tables 424.

FIG. 7 illustrates subscriber logging table 424 for storing log entries associated with a particular data table of source system 410. As shown in FIG. 7, a log entry of example subscriber logging table 424 includes the key fields of a changed data record of the particular data table (e.g., Order ID and Item ID), a sequence ID, a timestamp, an operation identifier (e.g. insert, update or delete), and an identifier of the user.

As described above, the sequence ID is assigned by the observer process when the record (reflecting a committed operation) is inserted into subscriber logging table 424. Insertion of a record in subscriber logging table 424 also triggers creation of a corresponding record in subscriber worklist 423 having status "open". The sequence IDs are assigned in an increasing sequence. Accordingly, the sequence IDs of each record of subscriber logging table 424 indicate an order in which each associated operation was committed to the database.

Each record of last-processed pointers 425 of FIG. 8 specifies, for a given client, subscriber, object, and logging table (because an object may be associated with more than one underlying data table), a pointer to a last successfully-processed logging table entry. Last-processed pointers 425 may be used to determine an initial logging table entry from which a plurality of sub-portions are defined for processing as illustrated in FIG. 3. Last-processed pointers 425 may also be used by a clean-up process to determine a lowest pointer (e.g., sequence ID) processed by all subscribers to a given logging table, and to delete all entries of the logging table having sequence IDs equal to or less than the lowest processed pointer.

Main portion 426 is called by data reconstruction and transfer process 421 to define sub-portions of logging table entries for a specified subscriber-object combination which are to be processed in parallel. The definitions are determined based on a last-processed pointer, a maximum pointer and a maximum number of records for the subscriber-object combination as described above. Main portion 426 stores the definitions in sub-portion information 427 and sub-portion boundaries 428. Sub-portion information 427 may provide sub-portion IDs and status handling data for the subscriber-object combination as shown in FIG. 9.

Sub-portion boundaries 428 may specify logging table entry boundaries for each sub-portion of each subscriber logging table of a sub-portion as shown in FIG. 10. In this regard, a sub-portion may be defined in some embodiments to include records from one or more subscriber logging tables. The boundaries specify the range of pointers that are covered by a sub-portion for each subscriber logging table. By inserting data into sub-portion information 427 and sub-portion boundaries 428 as it is determined, other processes can begin to reconstruct and transfer the data prior to definition of all sub-portions, which may improve overall latency.

According to some embodiments, main portion 426 updates a Boolean indicator (IN_CALCULATION) in a record of subscriber worklist 423 prior to defining sub-portions corresponding to the record. The value of this indicator, together with the availability of the exclusive lock that is set when the record is fetched from subscriber worklist 423, can be used to determine whether main portion 426 is currently calculating sub-portions. This determination facilitates recovery from interrupted calculations due to system outages.

Commit API 430 may be called by a subscriber to indicate to engine 420 that data associated with a given sub-portion was successfully transferred. Similarly, rollback API 432 may be called to indicate problems with data transfer for a particular sub-portion. Calls to either API may include the subscriber type, subscriber ID, object type, object name and sub-portion ID.

Figure 11:
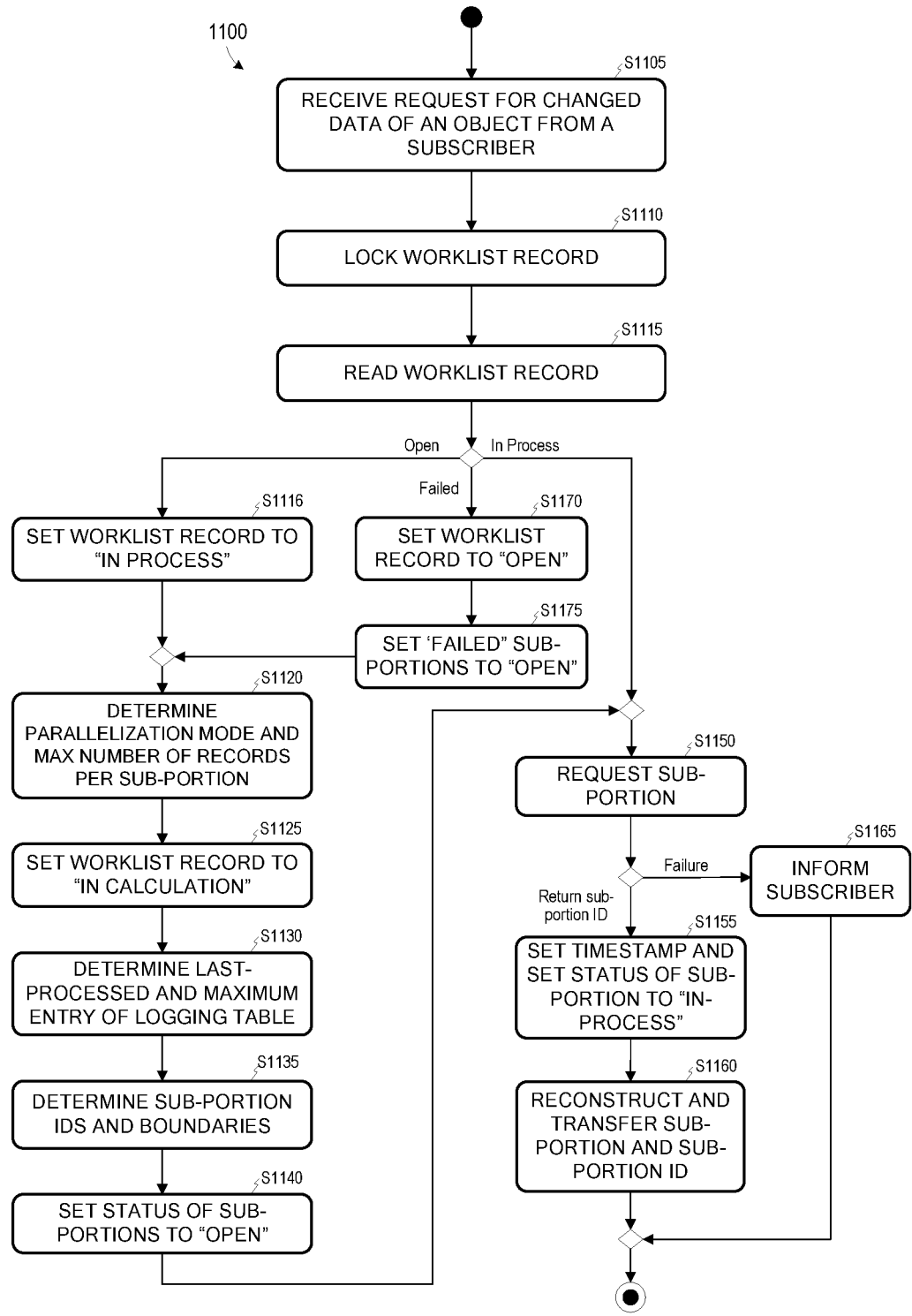
FIG. 11 is a flow diagram of a process to compile and transfer changes according to some embodiments.

FIG. 11 is a flow diagram of process 1100 according to some embodiments. Process 1100 will be described with respect to the components of FIG. 4 but embodiments are not limited thereto. As will be evident from the description below, process 1100 may be performed by each of multiple instances of data reconstruction and transfer process 421.

Initially, a request is received from a subscriber for changed data of an object at S1105. The request may be received via an API call from subscriber 450 to reader module 440. The request initiates a process which attempts to set an exclusive lock at S1110 for the subscriber worklist record associated with the object. This lock prevents a concurrent process from updating the status of the subscriber worklist record to "in process" and initiating calculation of sub-portions for the same object.

The worklist record is read at S1115. Flow proceeds to S1116 if the lock in S1110 was successful, and a worklist record corresponding to the subscriber-object combination exists and has a status of "open". As mentioned above, a record of a subscriber worklist associated with an object may be created with a status of "open" when a change to the data of the object occurs.

A parallelization mode and a maximum number of records per sub-portion are determined at S1120. It will be assumed that the performance settings corresponding to the present subscriber-object combination indicate the use of parallelization and a maximum number of records per sub-portion greater than 0. Otherwise, sequential processing of the subscriber logging table entries would be performed as is known.

According to some embodiments, data reconstruction and transfer process 421 sets the worklist record status to "in calculation" at S1125 and then instructs main portion 426 to define corresponding sub-portions. Accordingly, at S1130, main portion 426 determines the last-processed entry and the maximum entry of the corresponding logging table(s) are determined. The last-processed entry may be determined from table 425 as described above.

Main portion 426 determines sub-portion IDs and boundaries of a plurality of sub-portions at S1135. As described above, the boundaries may be determined based on the last-processed entry, the maximum entry, and the maximum number of records per sub-portion. In the case of a view object associated with more than one database table (and subscriber logging table), main portion 426 determine sub-portion ids and boundaries for each corresponding subscriber logging table at S1135.

Next, at S1140, main portion 426 sets the status of each sub-portion to "open" in sub-portion information 427. It should be noted that any previously-defined sub-portions which have not been processed successfully are not re-calculated and remain as previously-defined in sub-portion information 427 and sub-portion boundaries 428. Thus, if the maximum number of records per sub-portion of the object noted in performance settings 422 has been changed by the subscriber in the meantime, sizes of the previously-defined sub-portions will reflect the prior maximum number of records.

The current process then requests data of a sub-portion at S1150. In this regard, in a case that subscriber 450 initiates more than one process via API calls to reader 440, where each process is intended to process a sub-portion in parallel, all processes other than the first process will fail to set the exclusive lock at S1110 and proceed to S1150 to request a sub-portion. To prevent concurrent processes from fetching the data of the same sub-portion, main portion 426 may set an exclusive lock when a process is requesting a sub-portion ID by calling a method which raises an exception if a process is requesting a sub-portion ID although no sub-portions are yet available (i.e., "open") since the definition of sub-portions is still running in parallel. Data reader 440 may handle the exception by returning a respective code to the subscriber at S1165 to inform the subscriber regarding the current unavailability of sub-portions.

Once a sub-portion ID is returned to a process, a status associated with the sub-portion ID in sub-portion information 427 is set to "in process" and the status timestamp is updated at S1155. The ID is then passed to reconstruction and data transfer process 421 to reconstruct the data records associated with the sub-portion based on the key field values of the sub-portion. The required subscriber logging table records are selected based on the sub-portion ID and the boundaries specified in sub-portion boundaries 428.

The data records are transferred to the subscriber along with the sub-portion ID. The subscriber may subsequently use the sub-portion ID in an API call to commit or rollback the data transfer as will be described below.

The processing of one or more sub-portions may fail. As will be described below, such failure may result in setting the status of the corresponding subscriber worklist record and the status of the failed sub-portion(s) set to "failed". Accordingly, if the worklist record read at S1115 has a status of "failed", the worklist record is reset from "failed" to "open" at S1170 and the status of all corresponding failed sub-portions is reset from "failed" to "open" at S1175. Flow then proceeds to S1120 and continues as described above. The foregoing handles a situation in which some sub-portions already exist for the subscriber-object combination and supports defining of new sub-portions for logging table entries which were created since the last definition of sub-portions.

Figure 12:
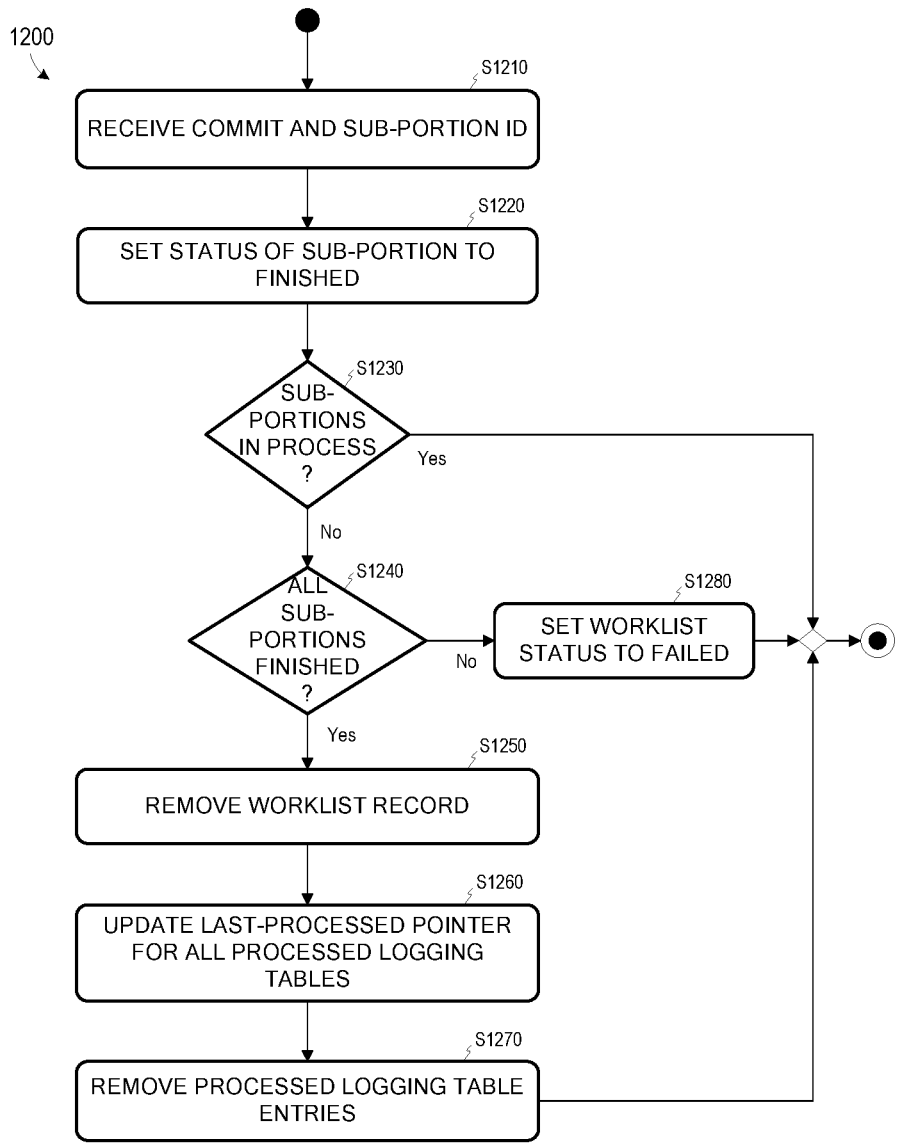
FIG. 12 is a flow diagram of a process to commit processing of a sub-portion according to some embodiments.

FIG. 12 is a flow diagram of process 1200 to handle a commit API call according to some embodiments. For example, subscriber 450 may call commit API 430 along with a sub-portion ID once the subscriber successfully transfers the data associated with the sub-portion ID to a target system. Main portion 426 receives the commit call and the sub-portion ID at S1210. In response, main portion 426 sets a status of the sub-portion to "finished" in sub-portion information 427 at S1220.

Main portion 426 then determines whether one or more other sub-portions are in process at S1230. If so, process 1200 terminates and the processing of the one or more other sub-portions continues. If not, it is determined at S1240 whether all the sub-portions defined along with the present sub-portion have a status of "finished". If not, then at least one sub-portion has a status of "failed" and flow proceeds to S1280 to set the status of the corresponding subscriber worklist record to "failed". As mentioned above, on a next read of the worklist record, the record and all associated "failed" sub-portions may be set to "open".

Alternatively, the worklist record is removed from subscriber worklist 423 if it is determined at S1240 that all the sub-portions defined along with the present sub-portion have a status of "finished". Next, the last-processed pointers associated with each subscriber logging table which was used to reconstruct the transferred data are updated at S1260 with a pointer to the maximum logging table entries used at S1130 to calculate the sub-portions. The processed logging table entries are removed at S1270. According to some embodiments, S1230 through S1270 may be performed by one or more other clean-up processes rather than in response to a commit call as described above.

Figure 13:
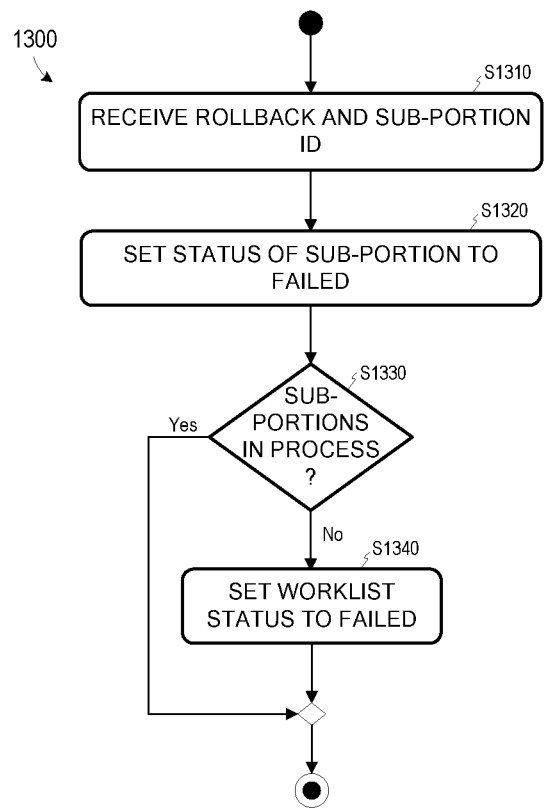
FIG. 13 is a flow diagram of a process to rollback processing of a sub-portion according to some embodiments.

FIG. 13 is a flow diagram of process 1300 to handle a rollback API call according to some embodiments. For example, subscriber 450 may call rollback API 432 along with a sub-portion ID once the subscriber determines that transfer of the data to the target system has failed. Main portion 426 receives the rollback call and the sub-portion ID at S1310 and sets a status of the sub-portion to "failed" in sub-portion information 427 at S1320.

Main portion 426 then determines whether one or more other sub-portions are in process at S1330. If so, process 1300 terminates and the processing of the one or more other sub-portions continues. If not, flow proceeds to S1340 to set the status of the corresponding subscriber worklist record to "failed". Again, S1330 and S1340 may be performed by one or more other clean-up processes rather than in response to a rollback call as described above.

The compilation and processing of sub-portions might be interrupted due to unexpected system or database issues. As a result, the compilation of sub-portions may be incomplete or a sub-portion may be indicated as "in process" although the subscriber is no longer processing the sub-portion, According to some embodiments, a check is run periodically (e.g., every ten minutes) to identify subscriber worklist records which have a status of "in calculation" but for which no lock is present. In view of the lock placed at S1110, such a scenario indicates that compilation of corresponding sub-portions was interrupted. Any such records are changed to status "open" to permit future compilation of the sub-portions.

Moreover, as described above, the status timestamp is updated with the current timestamp when the status of a sub-portion is updated. The status timestamp can therefore be checked to identify sub-portions which are erroneously indicated as "in process". According to some embodiments, a check is run periodically (e.g., every ten minutes) to identify every sub-portion that has been in "in process" status for at least one hour and to reset the status of the sub-portion to "open". As a result, a new process will be allowed to handle the sub-portion as described above.

Figure 14:
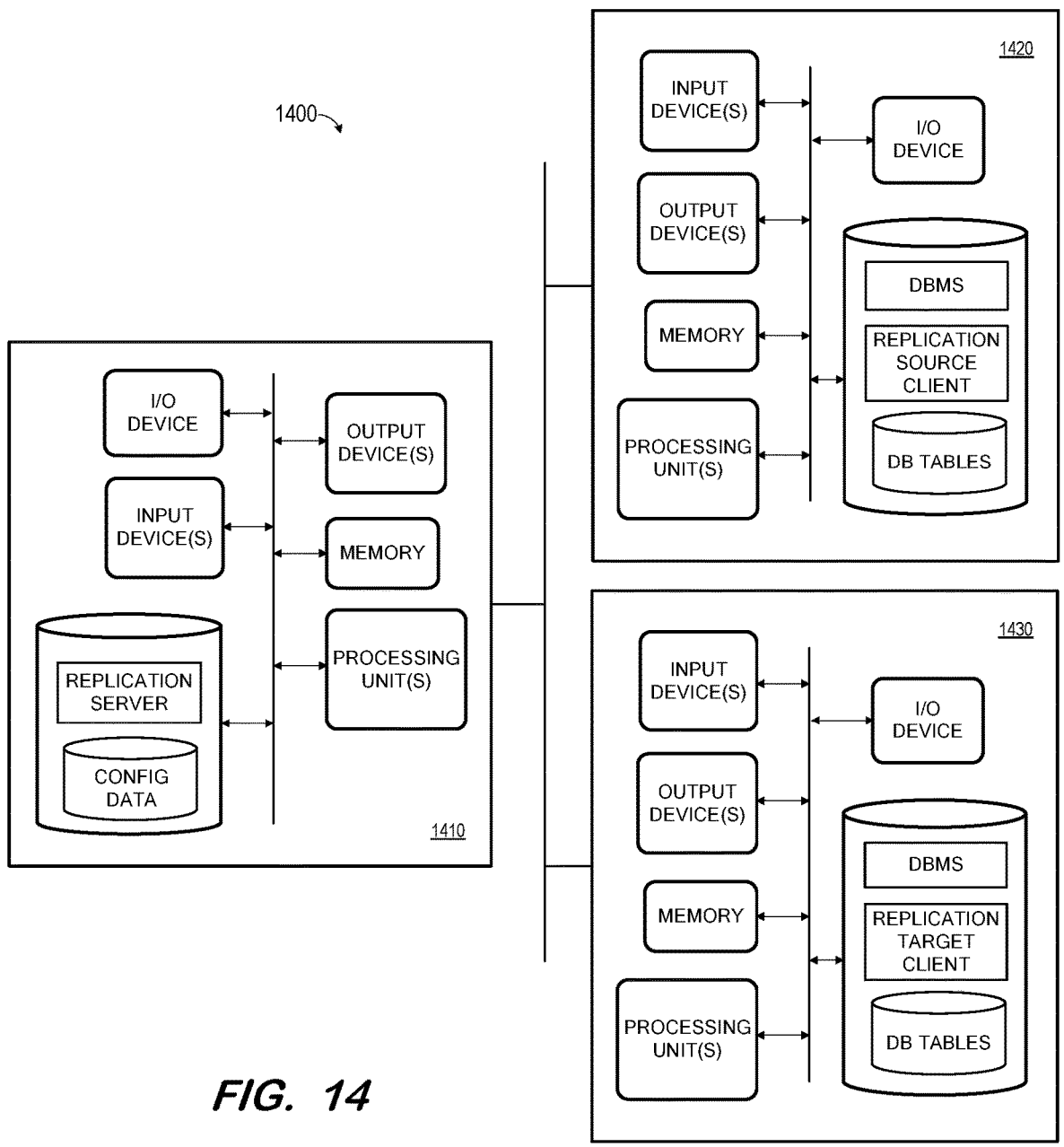
FIG. 14 is a block diagram of computing devices comprising a replication architecture for according to some embodiments.

FIG. 14 is a block diagram of system 1400 according to some embodiments. System 1400 includes replication system 1410, which may comprise an implementation of replication system 110 or subscriber 450. Replication system 1410 may be distributed from source system 1420 and communicate with source system 1420 via remote function calls as described herein. Source system 1420 may comprise an implementation of source system 120 or 310 and target system 1430 may comprise an implementation of target system 130. According to some embodiments, replication system 1410 may communicate simultaneously with many source systems and target systems to perform replication of objects as described herein. Each of systems 1410, 1420 and 1430 may comprise a general-purpose computing apparatus and may execute program code using processing unit(s) to perform any of the functions described herein. Each of systems 1410, 1420 and 1430 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps;
   a processing unit to execute the processor-executable process steps to cause the system to:
   receive a request for changed data of an object from a subscriber;
   determine a logging table associated with the object and comprising a plurality of logging table entries;
   determine a pointer to a last-processed entry of the logging table based on the object and the subscriber;
   determine a current maximum logging table entry and a maximum number of records per sub-portion associated with the object and the subscriber;
   define a plurality of sub-portions of logging table entries subsequent to the last-processed entry based on the pointer to the last-processed entry, the current maximum logging table entry and the maximum number of records per sub-portion;
   reconstruct and transfer first data associated with a first one of the plurality of sub-portions to the subscriber using a first process; and
   reconstruct and transfer second data associated with a second one of the plurality of sub-portions to the subscriber using a second process,
   wherein the first process and the second process operate in parallel.

2. A system according to claim 1, the processing unit to execute the processor-executable process steps to cause the system to:
   prior to definition of the plurality of sub-portions of logging table entries, determine to process the plurality of logging table entries in parallel based on settings data associated with the object and the subscriber.

3. A system according to claim 1, the processing unit to execute the processor-executable process steps to cause the system to:
   prior to definition of the plurality of sub-portions of logging table entries, determine to process the plurality of logging table entries in parallel based on settings data associated with the object and the subscriber.

4. A system according to claim 3, the processor-executable process steps further to cause the system to:
   receive a request for changed data of a second object from the subscriber;
   determine a second logging table associated with the second object and comprising a second plurality of logging table entries;
   determine to process the second plurality of logging table entries sequentially based on settings data associated with the second object and the subscriber;
   determine a pointer to a last-processed entry of the second logging table based on the second object and the subscriber; and
   reconstruct second data associated with entries of the second plurality of logging table entries subsequent to the last-processed entry; and
   transfer the second data to the subscriber.

5. A system according to claim 1, the processor-executable process steps further to cause the system to:
   determine that data of the object has changed; and
   in response to the determination that data of the object has changed, create a record of a subscriber worklist associating the subscriber with the object,
   wherein the first process sets an in process status of the record of the subscriber worklist, defines the plurality of sub-portions of logging table entries subsequent to the last-processed entry, and sets an open status of the record of the subscriber worklist after definition of the sub-portions.

6. A system according to claim 1, wherein the first process sets an in process status of the record of the subscriber worklist, defines the plurality of sub-portions of logging table entries subsequent to the last-processed entry, and sets an open status of the record of the subscriber worklist after definition of the sub-portions.

7. A computer-implemented method comprising:
   receiving a request for changed data of an object from a subscriber;
   determining a logging table associated with the object and comprising a plurality of logging table entries;
   determining a pointer to a last-processed entry of the logging table based on the object and the subscriber;
   determining a current maximum logging table entry and a maximum number of records per sub-portion associated with the object and the subscriber;
   defining a plurality of sub-portions of logging table entries subsequent to the last-processed entry based on the pointer to the last-processed entry, the current maximum logging table entry and the maximum number of records per sub-portion;
   reconstructing and transferring first data associated with a first one of the plurality of sub-portions to the subscriber using a first process; and
   reconstructing and transferring, in parallel with the first process, second data associated with a second one of the plurality of sub-portions to the subscriber using a second process.

8. A method according to claim 7, further comprising:
   prior to defining the plurality of sub-portions of logging table entries, determining to process the plurality of logging table entries in parallel based on settings data associated with the object and the subscriber.

9. A method according to claim 7, further comprising:
   prior to defining the plurality of sub-portions of logging table entries, determining to process the plurality of logging table entries in parallel based on settings data associated with the object and the subscriber.

10. A method according to claim 9, further comprising:
receiving a request for changed data of a second object from the subscriber;
determining a second logging table associated with the second object and comprising a second plurality of logging table entries;
determining to process the second plurality of logging table entries sequentially based on settings data associated with the second object and the subscriber;
determining a pointer to a last-processed entry of the second logging table based on the second object and the subscriber; and
reconstructing second data associated with entries of the second plurality of logging table entries subsequent to the last-processed entry; and
transferring the second data to the subscriber.

11. A method according to claim 7, further comprising:
determining that data of the object has changed; and
in response to determining that data of the object has changed, creating a record of a subscriber worklist associating the subscriber with the object,
wherein the first process sets an in process status of the record of the subscriber worklist, defines the plurality of sub-portions of logging table entries subsequent to the last-processed entry, and sets an open status of the record of the subscriber worklist after definition of the sub-portions.

12. A method according to claim 7, wherein the first process sets an in process status of the record of the subscriber worklist, defines the plurality of sub-portions of logging table entries subsequent to the last-processed entry, and sets an open status of the record of the subscriber worklist after definition of the sub-portions.

13. A system comprising:
a subscriber system;
a source database system storing a database table, the source database system comprising a processing unit to:
receive a request for changed data of the database table from the subscriber system;
determine a logging table associated with the database table and comprising a plurality of logging table entries;
determine a pointer to a last-processed entry of the logging table based on the database table and the subscriber;
determine a current maximum logging table entry and a maximum number of records per sub-portion associated with the database table and the subscriber;
define a plurality of sub-portions of logging table entries subsequent to the last-processed entry based on the pointer to the last-processed entry, the current maximum logging table entry and the maximum number of records per sub-portion; and
reconstruct and transfer first data associated with a first one of the plurality of sub-portions to the subscriber system using a first process; and
reconstruct and transfer second data associated with a second one of the plurality of sub-portions to the subscriber system using a second process,
wherein the first process and the second process operate in parallel.

14. A system according to claim 13, the processing unit of the source database system to:
prior to definition of the plurality of sub-portions of logging table entries, determine to process the plurality of logging table entries in parallel based on settings data associated with the database table and the subscriber system.

15. A system according to claim 13, the processing unit of the source database system to:
prior to definition of the plurality of sub-portions of logging table entries, determine to process the plurality of logging table entries in parallel based on settings data associated with the database table and the subscriber system.

16. A system according to claim 15, the processing unit of the source database system to:
receive a request for changed data of a second database table from the subscriber;
determine a second logging table associated with the second database table and comprising a second plurality of logging table entries;
determine to process the second plurality of logging table entries sequentially based on settings data associated with the second database table and the subscriber;
determine a pointer to a last-processed entry of the second logging table based on the second object and the subscriber; and
reconstruct second data associated with entries of the second plurality of logging table entries subsequent to the last-processed entry; and
transfer the second data to the subscriber system.

17. A system according to claim 13, the processing unit of the source database system to:
determine that data of the database table has changed; and
in response to the determination that data of the database table has changed, create a record of a subscriber worklist associating the subscriber with the database table,
wherein the first process sets an in process status of the record of the subscriber worklist, defines the plurality of sub-portions of logging table entries subsequent to the last-processed entry, and sets an open status of the record of the subscriber worklist after definition of the sub-portions.

18. A system comprising:
a memory storing processor-executable process steps;
a processing unit to execute the processor-executable process steps to cause the system to:
receive a request for changed data of an object from a subscriber;
determine a logging table associated with the object and comprising a plurality of logging table entries;
determine a pointer to a last-processed entry of the logging table based on the object and the subscriber;
define a plurality of sub-portions of logging table entries subsequent to the last-processed entry; and
reconstruct and transfer first data associated with a first one of the plurality of sub-portions to the subscriber using a first process; and
reconstruct and transfer second data associated with a second one of the plurality of sub-portions to the subscriber using a second process,
wherein the first process and the second process operate in parallel,
wherein the first process sets an in process status of the record of the subscriber worklist, defines the plurality of sub-portions of logging table entries subsequent to the last-processed entry, and sets an open status of the record of the subscriber worklist after definition of the sub-portions.

19. A computer-implemented method comprising:
receiving a request for changed data of an object from a subscriber;
determining a logging table associated with the object and comprising a plurality of logging table entries;
determining a pointer to a last-processed entry of the logging table based on the object and the subscriber;
defining a plurality of sub-portions of logging table entries subsequent to the last-processed entry;
reconstructing and transferring first data associated with a first one of the plurality of sub-portions to the subscriber using a first process; and
reconstructing and transferring, in parallel with the first process, second data associated with a second one of the plurality of sub-portions to the subscriber using a second process,
wherein the first process sets an in process status of the record of the subscriber worklist, defines the plurality of sub-portions of logging table entries subsequent to the last-processed entry, and sets an open status of the record of the subscriber worklist after definition of the sub-portions.

\* \* \* \* \*